(12) United States Patent
Teramoto

(10) Patent No.: US 10,154,231 B2
(45) Date of Patent: Dec. 11, 2018

(54) COMMUNICATION DEVICE AND COMMUNICATION METHOD

(71) Applicant: SONY CORPORATION, Tokyo (JP)

(72) Inventor: Satoshi Teramoto, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/535,520

(22) PCT Filed: Nov. 18, 2015

(86) PCT No.: PCT/JP2015/082475
§ 371 (c)(1),
(2) Date: Jun. 13, 2017

(87) PCT Pub. No.: WO2016/108265
PCT Pub. Date: Jul. 7, 2016

(65) Prior Publication Data
US 2017/0353692 A1 Dec. 7, 2017

(30) Foreign Application Priority Data

Dec. 29, 2014 (JP) .................................. 2014-267038

(51) Int. Cl.
*H04N 7/10* (2006.01)
*H04N 21/436* (2011.01)
(Continued)

(52) U.S. Cl.
CPC ............. *H04N 7/104* (2013.01); *H04N 7/108* (2013.01); *H04N 21/4126* (2013.01);
(Continued)

(58) Field of Classification Search
None
See application file for complete search history.

(56) References Cited

U.S. PATENT DOCUMENTS

| 2010/0134698 A1* | 6/2010 | Low | H04N 5/63 |
| | | | 348/730 |
| 2011/0170011 A1* | 7/2011 | Choi | H04N 5/38 |
| | | | 348/725 |
| 2014/0244890 A1* | 8/2014 | Park | G06F 13/4068 |
| | | | 710/317 |

FOREIGN PATENT DOCUMENTS

| CN | 102714753 A | 10/2012 |
| EP | 2524517 A2 | 11/2012 |

(Continued)

OTHER PUBLICATIONS

MHL LLC, "Mobile High-Definition Link (MHL), Technology White Paper", Oct. 2013, pp. 1-8.*

(Continued)

*Primary Examiner* — Nicholas T Corbo
(74) *Attorney, Agent, or Firm* — Chip Law Group

(57) ABSTRACT

An effect of crosstalk and unnecessary congestion on a transmission path having a plurality of lanes is improved. A source device 210 includes switches 211-1, . . . , and 211-N for respectively connecting TMDS channels 231-1, . . . , and 231-N to a corresponding signal pin of a transmission unit 211 or ground, and a sink device 220 includes switches 221-1, . . . , and 221-N for respectively connecting TMDS channel 231-1, . . . , and 231-N to a corresponding signal pin of a reception unit 221 or ground. Both the source device 210 and the sink device 220 ground a signal line of the TMDS channels 231-1, . . . , and 231-N which does not perform communication.

9 Claims, 6 Drawing Sheets

(51) Int. Cl.
   *H04N 21/4425*   (2011.01)
   *H04N 21/41*     (2011.01)
   *H04N 21/4363*   (2011.01)

(52) U.S. Cl.
   CPC ..... *H04N 21/436* (2013.01); *H04N 21/43635* (2013.01); *H04N 21/4425* (2013.01)

(56) References Cited

FOREIGN PATENT DOCUMENTS

| | | |
|---|---:|---:|
| JP | 4-367139 A | 12/1992 |
| JP | 2012-169702 A | 9/2012 |
| JP | 2013-517696 A | 5/2013 |
| KR | 10-2012-0116483 A | 10/2012 |
| TW | 201218753 A | 5/2012 |
| WO | 2011/088207 A2 | 7/2011 |

OTHER PUBLICATIONS

International Search Report and Written Opinion of PCT Application No. PCT/JP2015/082475, dated Feb. 9, 2016, 01 pages of English Translation and 05 pages of ISRWO.

\* cited by examiner

COMMUNICATION DEVICE AND COMMUNICATION METHOD

CROSS REFERENCE TO RELATED APPLICATIONS

This application is a U.S. National Phase of International Patent Application No. PCT/JP2015/082475 filed on Nov. 18, 2015, which claims priority benefit of Japanese Patent Application No. JP 2014-267038 filed in the Japan Patent Office on Dec. 29, 2014. Each of the above-referenced applications is hereby incorporated herein by reference in its entirety.

TECHNICAL FIELD

The technology disclosed in the present specification relates to a communication device and a communication method for transmitting data according to a predetermined communication interface standard, and for example, relates to a communication device and a communication method for transmitting a video and audio signal according to the mobile high-definition link (MHL).

BACKGROUND ART

In recent years, a portable device which can display a video with high definition such as a smartphone and a tablet has been widely used. Accordingly, development in the MHL which is a communication interface standard to transmit a video at high speed for the portable device has been proceeded (for example, refer to Patent Document 1).

As a communication interface standard for realizing digital video transmission, the high definition multimedia interface (HDMI) (registered trademark) is exemplified. Whereas, main characteristics of the MHL is to minimize a mounting area as a minimum pin configuration necessary for video transmission and to assist power supply.

The MHL devices are classified into three categories, i.e., a source device for transmitting a video signal, a sink device for receiving and displaying the video signal, and a dongle device for converting the video signal in the MHL format into the other video signal. Then, an MHL cable which satisfies the MHL standard is used to connect the MHL devices and to transmit signals between the MHL devices. The source device includes a personal computer, a smartphone, a tablet terminal, a game machine, and a digital camera. Also, the sink device includes a display device such as a digital TV. A single MHL cable connects the source device to the sink device so that a video with high definition can be transmitted and power can be supplied (charge the source device). In the MHL standard, it is basically assumed that a video signal be transmitted from the source device to the sink device in one direction.

CITATION LIST

Patent Document

Patent Document 1: Japanese Patent Application Laid-Open No. 2012-169702

SUMMARY OF THE INVENTION

Problems to be Solved by the Invention

A purpose of the technology disclosed in the present specification is to provide an excellent communication device and communication method which can preferably transmit a video and audio signal according to a predetermined communication interface standard.

Solutions to Problems

The technology disclosed in the present specification has been made in consideration of the above problems. A first aspect of the technology is a communication device, for communicating with a communication partner via a transmission cable including a plurality of signal lines for transmitting a video or audio signal, which includes a communication unit which communicates a video or audio signal by using at least a part of the plurality of signal lines, a switch which connects each of the plurality of signal lines to the communication unit or ground, and a control unit which controls connection switching of the switch.

According to a second aspect of the technology disclosed in the present specification, the control unit of the communication device according to the first aspect is configured to ground a signal line which does not perform communication in a state where the communication device communicates a video or audio signal with the communication partner.

According to a third aspect of the technology disclosed in the present specification, the control unit of the communication device according to the first aspect is configured to determine a signal line which does not perform communication at the time of communication of a video or audio signal with the communication partner on the basis of a capability of the communication partner.

According to a fourth aspect of the technology disclosed in the present specification, the communication device according to the third aspect is configured to transmit signal line information on the signal line which does not perform communication from the communication unit to the communication partner.

According to a fifth aspect of the technology disclosed in the present specification, the control unit of the communication device according to the first aspect is configured to ground a signal line, which does not perform communication at the time of communication of a video or audio signal with the communication partner, determined on the basis of a capability of the communication device.

According to a sixth aspect of the technology disclosed in the present specification, the communication device according to the first aspect is configured to receive signal line information on the signal line, which does not perform communication at the time of communication of a video or audio signal with the communication partner, determined by the communication partner from the communication partner by the communication unit.

According to a seventh aspect of the technology disclosed in the present specification, the communication device according to the first aspect is configured so that the control unit does not ground the signal line which does not perform communication when the communication partner does not have a function for grounding a signal line.

According to an eighth aspect of the technology disclosed in the present specification, in the communication device according to the first aspect, the transmission cable complies with the MHL standard.

Also, a ninth aspect of the technology disclosed in the present specification is a communication method, for communicating with a communication partner via a transmission cable including a plurality of signal lines for transmitting a video or audio signal, including a control step of controlling connection switching of a switch for connecting each of the plurality of signal lines to the communication unit or ground and a communication step of communicating a video or audio signal by using at least a part of the plurality of signal lines.

Effects of the Invention

According to the technology disclosed in the present specification, an excellent communication device and communication method can be provided which can improve an effect of crosstalk and unnecessary congestion on a transmission path having a plurality of lanes and preferably transmit a video and audio signal.

Note that the effects described in the present specification are only exemplary, and the effect of the present invention is not limited to those. Also, there is a case where the present invention has an additional effect other than the effects described above.

Other purpose, characteristics, and advantages of the technology disclosed in the present specification would be obvious by the detailed description on the basis of the embodiment described below and the attached drawings.

MODE FOR CARRYING OUT THE INVENTION

An embodiment of the technology disclosed in the present specification is described in detail below with reference to the drawings.

Figure 1:
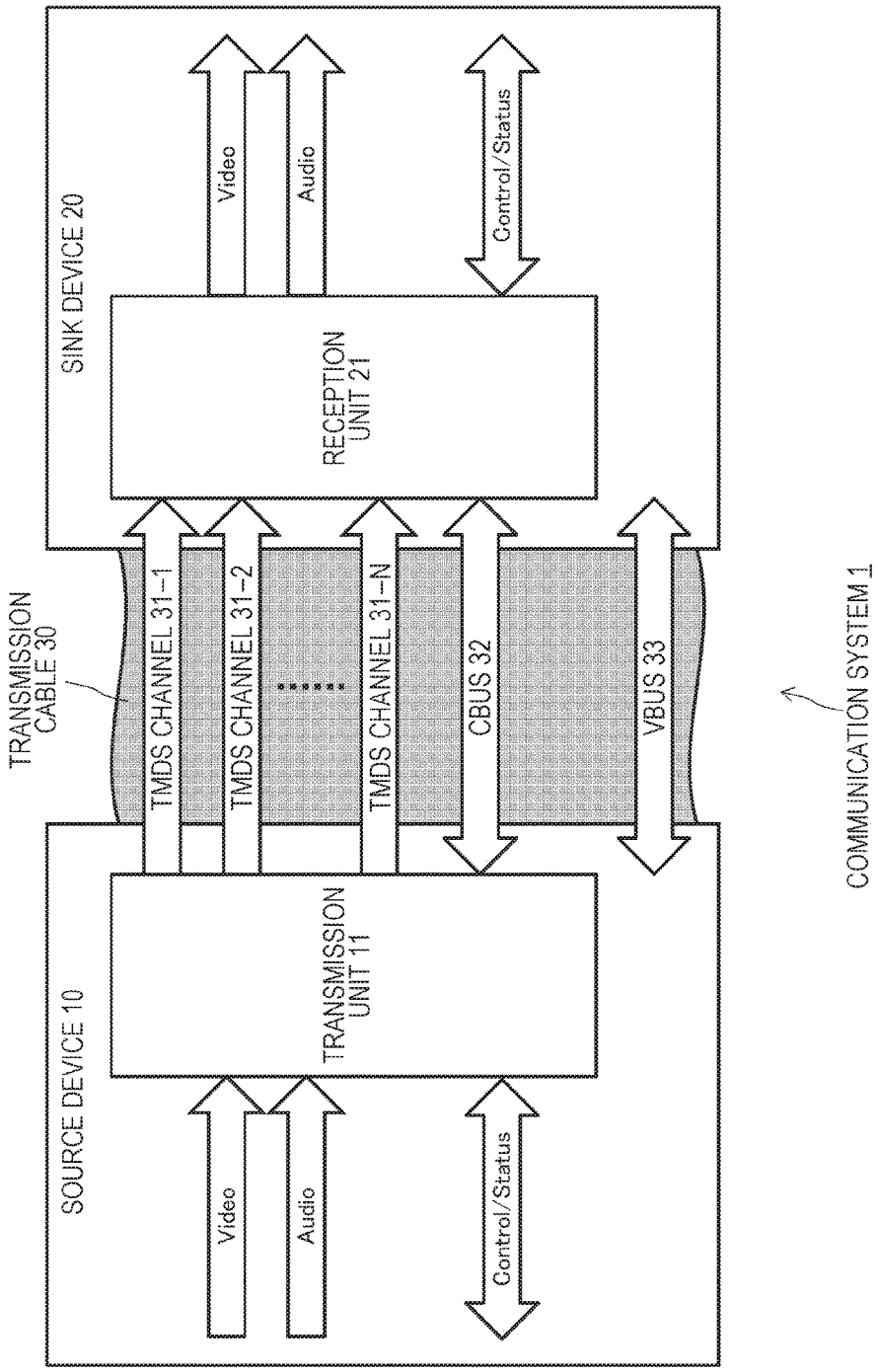
FIG. 1 is a schematic diagram of a basic configuration of a communication system 1.

In FIG. 1, a basic configuration of a communication system 1 for transmitting a video and a voice is schematically illustrated. The communication system 1 is configured of a combination of a source device 10 and a sink device 20. The source device 10 is a supply source of video information and audio information, and a portable device such as a smartphone is assumed as the source device 10. Also, the sink device 20 is an output destination of video information and audio information, and an installed apparatus having a large screen such as a television receiver is assumed as the sink device 20.

The source device 10 includes a transmission unit 11, and the sink device 20 includes a reception unit 21. A transmission cable 30 complying with a predetermined communication interface standard such as the MHL connects between the transmission unit 11 and the reception unit 21.

The transmission cable 30 includes N transition minimized differential signaling (TMDS) channels 31-1, . . . , and 31-N, a control bus (CBUS) or an eCBUS 32, and a voltage bus (VBUS) 33.

The TMDS channels 31-1, . . . , and 31-N are differential line pairs mainly used to transmit moving-image video information and audio information. A single TMDS channel is referred to as a "lane". In the example illustrated in FIG. 1, the communication system 1 includes N lanes. Note that a single lane is assumed in versions 1 to 3 of the MHL. However, in the technology disclosed in the present specification, it is assumed that the source device 10 and the sink device 20 are connected to each other with a plurality of lanes. By using multiple lanes, a bandwidth becomes higher, and a high-resolution video signal can be transmitted. Also, the TMDS is a transmission method of a digital video signal standardized by the Video Electronics Standards Association (VESA). The detailed description on the TMDS is omitted.

The CBUS 32 is a bidirectional data bus mainly used to control video and voice transmission and used for communication to perform device cooperation. The CBUS 32 is referred to as a CBUS in the versions 1 and 2 of the MHL and is referred to as an eCBUS since the version 3. However, the CBUS 32 is collectively referred to as a "CBUS" below.

The VBUS 33 is a power source line mainly used to supply power. Basically, for example, 5-volt power is supplied in a direction from the sink device 20 such as a television receiver to be connected to a commercial power supply to the source device 10 driven by a battery such as a smartphone.

Video information (Video) and audio information (Audio) reproduced by an information reproduction unit which is not shown are supplied to the transmission unit 11 of the source device 10. Then, the transmission unit 11 transmits the moving-image video information and the audio information by using one or two or more lanes of the TMDS channels 31-1, . . . , and 31-N in the transmission cable 30.

On the other hand, when receiving the moving-image video information and the audio information transmitted by using one or two or more lanes of the TMDS channels 31-1, . . . , and 31-N in the transmission cable 30, the reception unit 21 of the sink device 20 displays it on a screen and outputs voice by using an information output unit which is not shown.

In the MHL standard, the higher bandwidth of the TMDS channel for transmitting the video and an increase in a transfer rate are considered. Also, the communication system 1 illustrated in FIG. 1 can transmit a large amount of video data by using the plurality of lanes.

However, in actual communication, a data amount is different for each content (image size and frame rate), and the number of necessary lanes is different according to the data amount. Also, depending on a difference between capabilities (adaptable resolution, adaptable transmission rate, and the number of adaptable lanes) of the source device and the sink device, it is not necessary to use all the lanes included in the transmission cable when the content is transmitted.

There is a problem in that an effect of crosstalk and unnecessary radiation due to the signal lines which do not perform communication is caused in a state where some signal lines perform communication in the transmission cable in which multiple signal lines are bundled. The crosstalk and the unnecessary radiation are caused by maintaining the signal lines which do not perform communication in a connected state, that is, a floating state.

Therefore, in the present specification, the technology is disclosed which improves the effects of the crosstalk and the unnecessary radiation by grounding the signal line which does not perform communication in both the source device and the sink device in a state where some signal lines included in the transmission cable perform communication between the source device and the sink device.

Furthermore, for example, in a case where one of the source device and the sink device has a unit for grounding the signal lines, when the signal line is grounded in one of the source device and the sink device, the signal line may work as an antenna, and the signal line may be a generation source of unnecessary radio waves. Therefore, the unused signal line should be grounded in both the source device and the sink device, and grounding the signal line in one of the source device and the sink device should be avoided.

Figure 2:
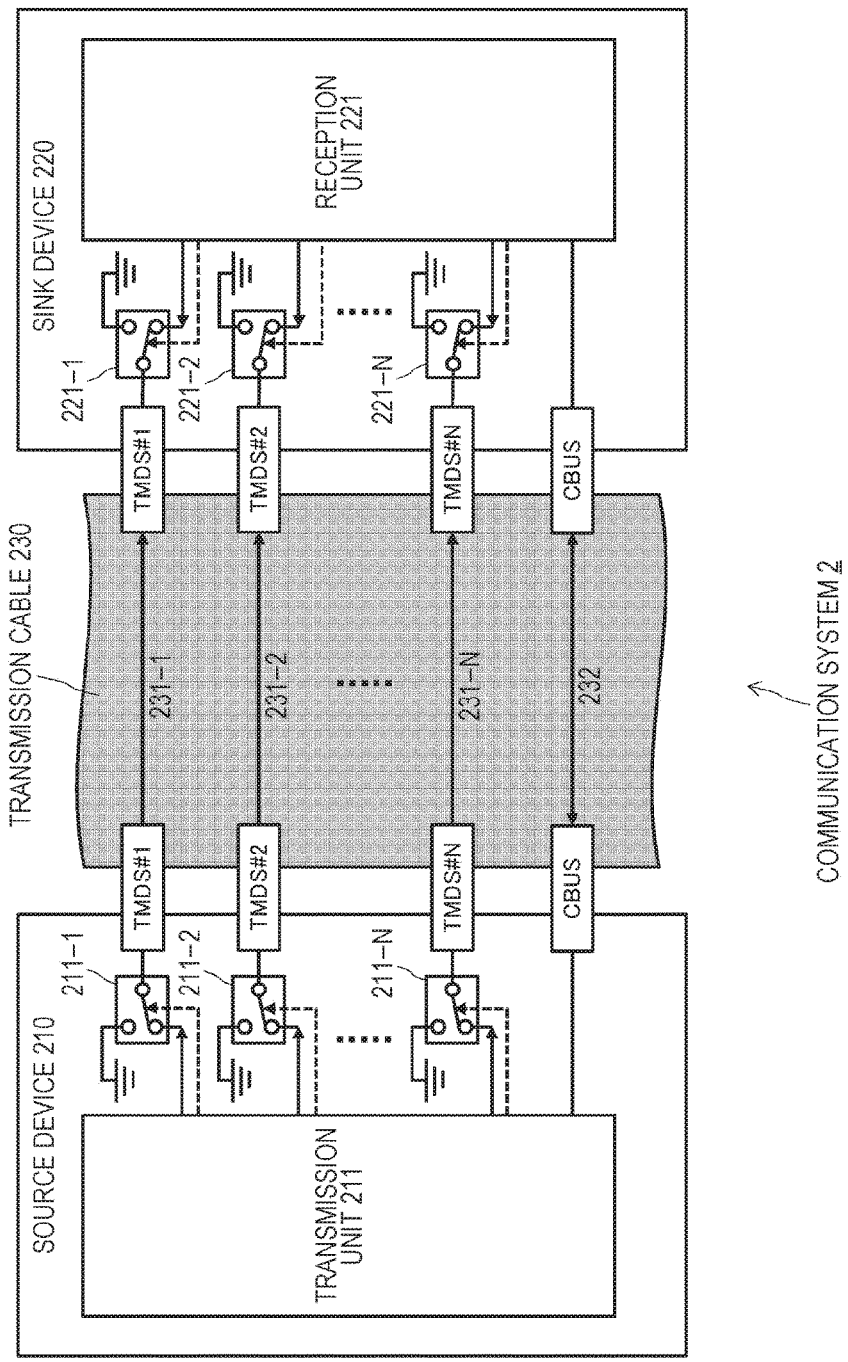
FIG. 2 is a diagram of an exemplary configuration of a communication system 2 having a grounding function of a signal line.

In FIG. 2, an exemplary configuration of a communication system 2 including a grounding function of a signal line is illustrated. The communication system 2 is configured of a combination of a source device 210 and a sink device 220. The source device 210 includes a transmission unit 211, and the sink device 220 includes a reception unit 221. A transmission cable 230 connects between the transmission unit 211 and the reception unit 221. The transmission cable 230 includes N TMDS channels 231-1, . . . , and 231-N (N is an integer of two or more) mainly used to transmit the moving-image video information and the audio information and a CBUS 232 for bidirectionally transmitting data.

The source device 210 includes switches 211-1, . . . , and 211-N for respectively connecting the TMDS channels 231-1, . . . , and 231-N to a signal pin or ground corresponding to the transmission unit 211. It is assumed that the transmission unit 210 control the connection switching of each of the switches 211-1, . . . , and 211-N. Also, the sink device 220 includes switches 221-1, . . . , and 221-N for respectively connecting the TMDS channels 231-1, . . . , and 231-N to a signal pin or ground corresponding to the reception unit 221. It is assumed that the reception unit 220 control the connection switching of each of the switches 221-1, . . . , and 221-N.

Both the source device 210 and the sink device 220 control the switching of the switches 211-1, . . . , and 211-N and the switch 221-1, and 221-N so that the signal line which does not perform communication of the TMDS channels 231-1, . . . , and 231-N is grounded when the video or the audio signal is transmitted. Also, the source device 210 and the sink device 220 synchronously control the switching of the switches 211-1, . . . , and 211-N and the switches 221-1, . . . , and 221-N for each other by bidirectional data communication via the CBUS 232.

Furthermore, when the signal line is grounded in one of the source device 210 and the sink device 220, the signal line may work as an antenna. Therefore, unused signal line is grounded in both the source device 210 and the sink device 220.

Figure 3:
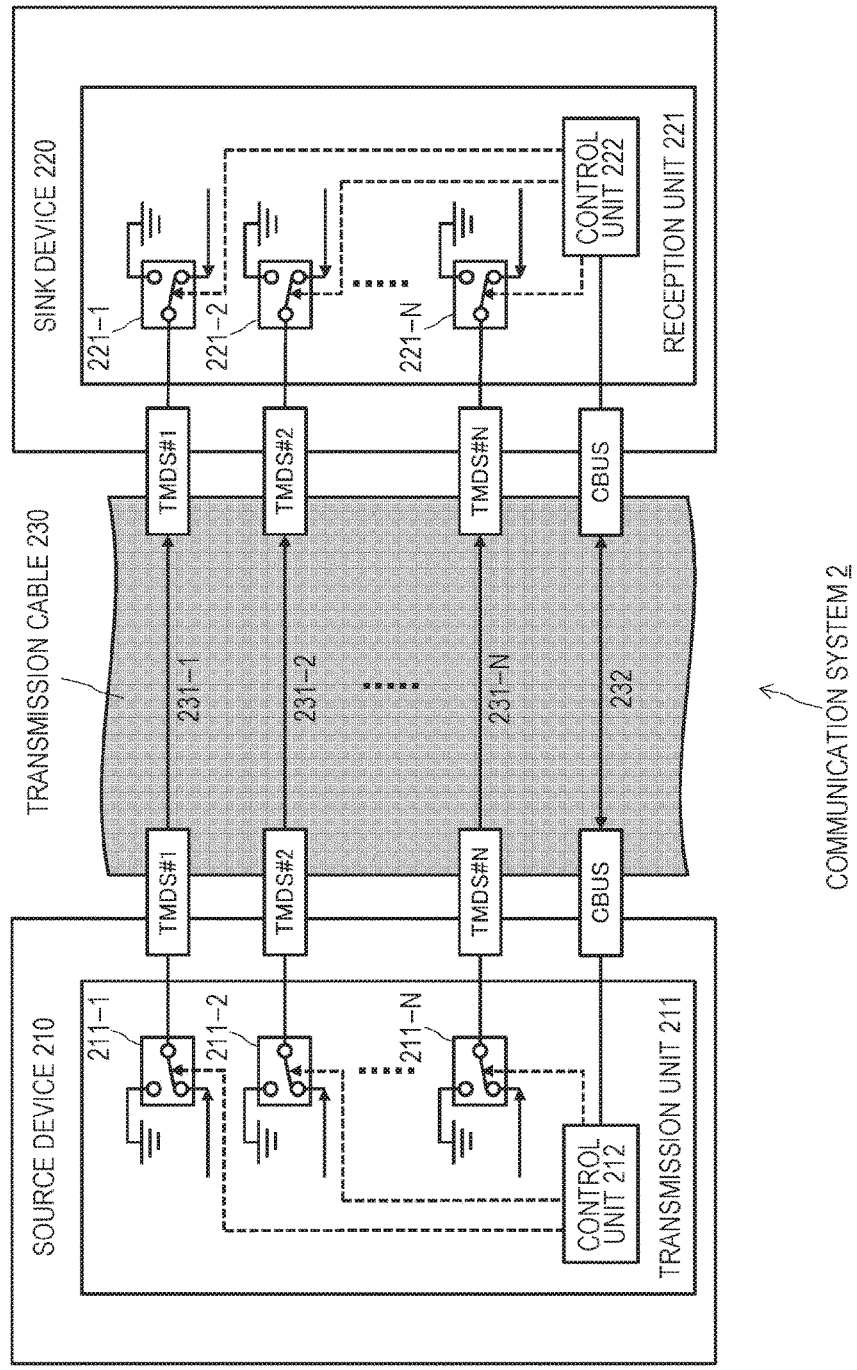
FIG. 3 is a diagram of a modification of the communication system illustrated in FIG. 2.

In FIG. 3, a modification of the communication system. 2 in FIG. 2 is illustrated. In the exemplary configuration illustrated in FIG. 2, the switches 211-1, . . . , and 211-N are disposed outside the transmission unit 211 of the source device 210, and the switches 221-1, . . . , and 221-N are disposed outside the reception unit 221 of the sink device 220. Whereas, in the exemplary configuration illustrated in FIG. 3, the switches 211-1, . . . , and 211-N are mounted as internal elements of a circuit chip in the transmission unit 211 of the source device 210, and the switches 221-1, . . . , and 221-N are mounted as internal elements of a circuit chip in the reception unit 221 of the sink device 220. It is assumed that a control unit 212 in the transmission unit 210 control the connection switching of each of the switches 211-1, . . . and 211-N on the basis of the result of communication with the sink device 220 via the CBUS 232. Also, the sink device 220 includes switches 221-1, . . . , and 221-N for respectively connecting the TMDS channels 231-1, . . . , and 231-N to a signal pin or ground corresponding to the reception unit 221. It is assumed that a control unit 222 in the reception unit 220 control the connection switching of each of the switches 221-1, . . . , and 221-N on the basis of the result of communication with the source device 210 via the CBUS 232.

A communication system can be configured of a combination of the source device illustrated in FIG. 2 and the sink device illustrated in FIG. 3 or a combination of the source device illustrated in FIG. 3 and the sink device illustrated in FIG. 2.

Figure 4:
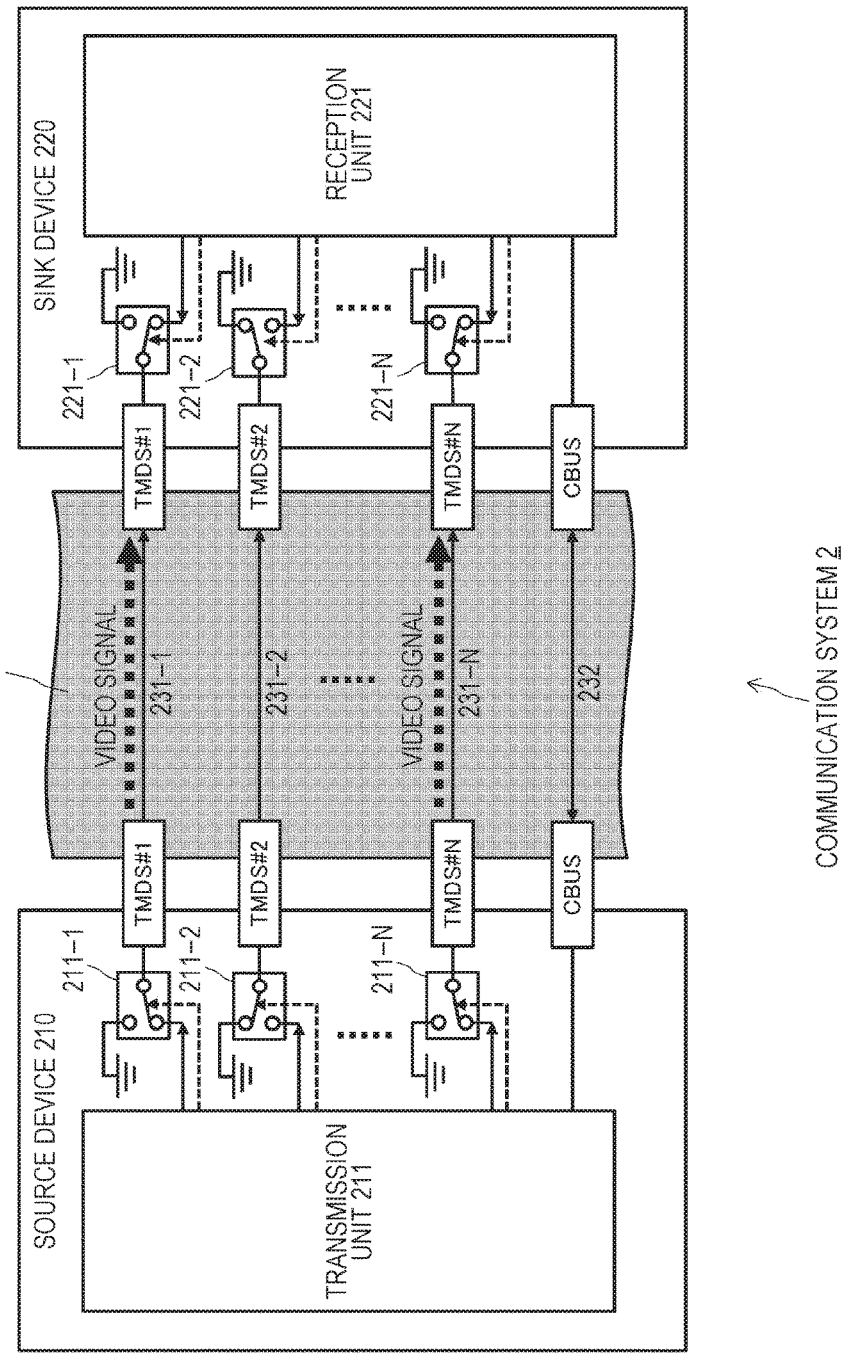
FIG. 4 is a diagram of an exemplary operation of the communication system 2 illustrated in FIG. 2.
Figure 5:
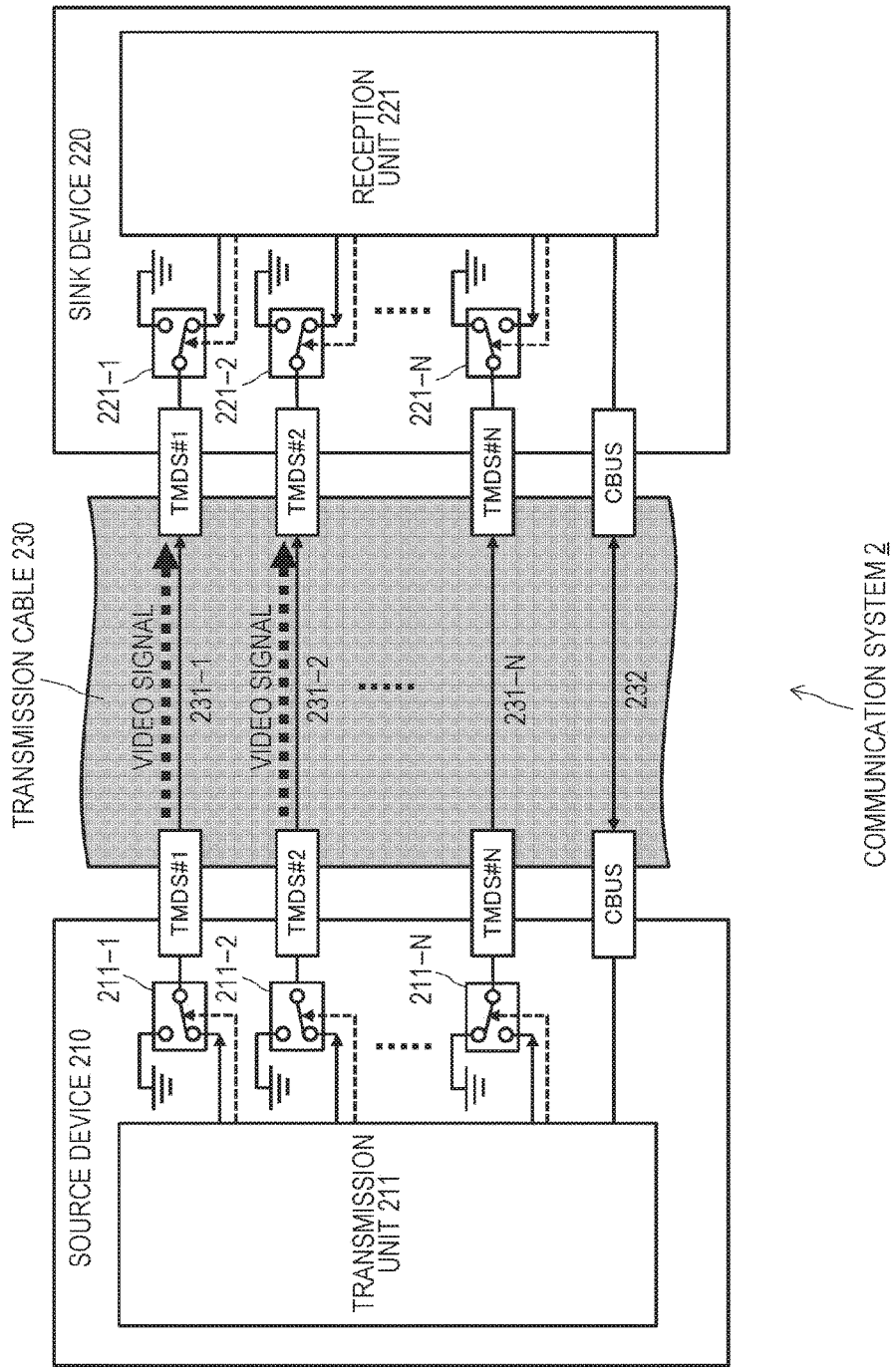
FIG. 5 is a diagram of an exemplary operation of the communication system 2 illustrated in FIG. 2.

An exemplary operation of the communication system 2 in FIG. 2 is illustrated in FIGS. 4 and 5. In the exemplary operation illustrated in FIG. 4, in a state where a video signal is transmitted between the source device 210 and the sink device 220, communication is not performed through the signal line of the TMDS channel 231-2. Therefore, the switch 211-2 of the source device 210 is grounded, and the switch 221-2 of the sink device 220 is grounded. Accordingly, the effect of the crosstalk and the unnecessary radiation caused by the unused signal line 231-2 is improved. Also, in the exemplary operation illustrated in FIG. 5, in a state where a video signal is transmitted between the source device 210 and the sink device 220, communication is not performed through the signal line of the TMDS channel 231-N. Therefore, the switch 211-N of the source device 210 is grounded, and the switch 221-N of the sink device 220 is grounded. Accordingly, the effect of the crosstalk and the unnecessary radiation caused by the unused signal line 231-N is improved.

Figure 6:
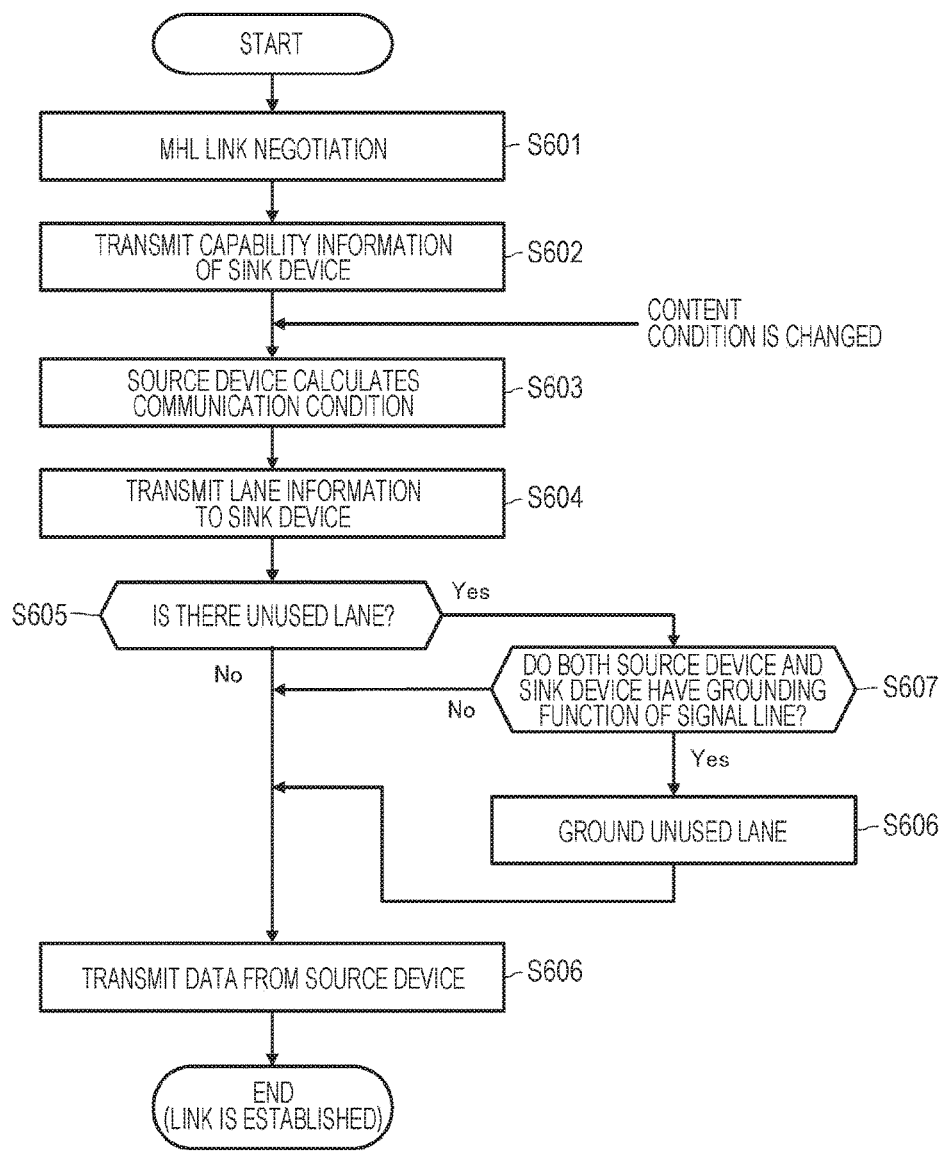
FIG. 6 is a flowchart of a processing procedure performed by the communication system 2.

In FIG. 6, a processing procedure performed by the communication system 2 to realize the operations illustrated in FIGS. 4 and 5 is illustrated in a form of a flowchart. The illustrated processing procedure is realized by a cooperative operation of the source device 210 and the sink device 220.

When the source device 210 and the sink device 220 are connected with the transmission cable 230, MHL link negotiation is performed by starting an MHL discovery process from the reception unit 221 of the sink device 220 (step S601).

Then, the sink device 220 transmits capability information of the sink device 220 to the source device 210 (step S602). The capability information indicated here includes the resolution of a content supported by the sink device 220, the adaptable frame rate, the number of adaptable lanes, and the adaptable transmission rate of each lane.

Subsequently, the source device 210 calculates a communication condition to transmit the content to the sink device 220 in consideration of the capability information of the sink device 220 (step S603). The communication condition includes the number of lanes to be used and a transmission rate of each lane.

For example, when it is assumed that the maximum transmission rate be six Gbps and the number of available lanes be six in the capability information of the sink device 220 while the amount of data of the content to be sent is 18 Gbps, a necessary amount of data equivalent to 18 Gbps can be sent by using three lanes. Alternatively, a transmission rate may be set to the minimum transmission rate of three Gpbs at which a necessary amount of data equivalent to 18 Gbps can be sent by using all the six available lanes.

Then, the source device 210 transmits lane information including the number of all the lanes to be used to transmit the content and information specifying the lane to be used (or unused lane) to the sink device 220 (step S604).

Here, it is checked whether there is an unused lane to transmit the content from the source device 210 to the sink device 220 (step S605).

When there is no unused lane (No in step S605), the source device 210 transmits the data to the sink device 220 by using all the lanes (step S606) and establishes a link. Then, the present processing routine is completed.

On the other hand, when there is an unused lane (Yes in step S605), it is further checked whether both the source device 210 and the sink device 220 have the grounding function of the unused lanes (refer to FIGS. 2 and 3) (step S607).

When both the source device 210 and the sink device 220 have the grounding function of the unused lanes (Yes in step S607), both the source device 210 and the sink device 220 perform grounding processing for the unused lanes on the basis of the lane information sent in step S604 (step S608). After that, the source device 210 transmits the data to the sink device 220 by using the lanes specified by the lane information (step S606) to establish the link, and the present processing routine is completed.

On the other hand, when at least one of the source device 210 and the sink device 220 does not have the grounding function of the unused lane (No in step S607), both the source device 210 and the sink device 220 do not ground the unused lane, and the source device 210 transmits the data to the sink device 220 by using the lanes specified by the lane information (step S606) to establish the link. Then, the present processing routine is completed.

When the link with the sink device 220 is established, the source device 210 constantly monitors the content. When a condition of the content is changed (for example, resolution of content is changed), the procedure returns to step S603. Then, the number of necessary lanes is calculated, and the similar processing is repeated.

According to the technology disclosed in the present specification, the following effects can be expected.

(1) By dynamically providing an unused high-speed transmission line on the basis of a condition of a transmission content, an inductance of a whole transmission cable can be reduced. As a result of this, improvement in the unnecessary radiation and improvement in the crosstalk between the transmission lines can be expected.

(2) When the source device and the sink device of which the numbers of adaptable lanes are different from each other are connected by a common cable, an unused line of one of the source device and the sink device is in a floating state, and this adversely affects the unnecessary radiation and the like. Whereas, according to the technology disclosed in the present specification, since the unused line is grounded, characteristic can be maintained.

(3) The improvement in the unnecessary radiation and the crosstalk can be realized without making the user be conscious of the unused lanes at the time of the content transmission.

INDUSTRIAL APPLICABILITY

The technology disclosed in the present specification has been described above in detail with reference to the specific embodiment. However, it is obvious that those skilled in the art can amend and substitute the embodiment without departing from the scope of the technology disclosed in the present specification.

In the present specification, the embodiment has been mainly described in which the technology disclosed in the present specification has been applied to the communication system having devices connected to each other with an MHL-based communication interface. However, the scope of the technology disclosed in the present specification is not limited to this. Similarly, the technology disclosed in the present specification can be applied to a communication system complying with various communication interface standards for transmitting the video information and the audio information by using the plurality of lanes.

In a word, the technology disclosed in the present specification has been described as an example, and the described matter in the present specification should not be restrictively interpreted. Claims should be considered in order to determine the scope of the technology disclosed in the present specification.

Furthermore, the technology disclosed in the present specification can have the following configuration.

(1) A communication device for communicating with a communication partner via a transmission cable including a plurality of signal lines for transmitting a video or audio signal, including:

a communication unit configured to communicate a video or audio signal by using at least a part of the plurality of signal lines;

a switch configured to connect each of the plurality of signal lines to the communication unit or ground; and a control unit configured to control connection switching of the switch.

(2) The communication device according to (1), wherein the control unit grounds a signal line which does not perform communication in a state where the communication device communicates the video or audio signal with the communication partner.

(3) The communication device according to (1), wherein the control unit determines a signal line which does not perform communication at the time of communication of the video or audio signal with the communication partner on the basis of a capability of the communication partner.

(4) The communication device according to (3), wherein the communication unit transmits signal line information on the signal line which does not perform communication to the communication partner.

(5) The communication device according to (1), wherein the control unit grounds a signal line, which does not perform communication at the time of communication of the video or audio signal with the communication partner, determined on the basis of a capability of the communication device.

(6) The communication device according to (1), wherein the communication unit receives signal line information on a signal line, which does not perform communication at the time of communication of the video or audio signal with the communication partner, determined by the communication partner from the communication partner.

(7) The communication device according to (1), wherein when the communication partner does not have a function for grounding a signal line, the control unit does not ground a signal line which does not perform communication.

(8) The communication device according to claim 1, wherein the transmission cable complies with the MHL standard.

(9) A communication method for communicating with a communication partner via a transmission cable including a plurality of signal lines for transmitting a video or audio signal, including:

a control step of controlling connection switching of a switch for connecting each of the plurality of signal lines to the communication unit or ground; and a communication step of communicating a video or audio signal by using at least a part of the plurality of signal lines.

REFERENCE SIGNS LIST 1 communication system
10 source device
11 transmission unit
20 sink device
21 reception unit
30 transmission cable
31-1~31-N TMDS channel
32 CBUS
33 VBUS
2 communication system
210 source device
211 transmission unit
211-1, . . . , and 211-N switch
212 control unit
220 sink device
221 reception unit
221-1, . . . , and 221-N switch
222 control unit
230 transmission cable
231-1~231-N TMDS channel
232 CBUS

The invention claimed is:

1. A communication device, comprising:
 a communication unit configured to communicate, via at least a first signal line of a plurality of signal lines of a transmission cable, at least one of a video signal or an audio signal with a communication partner;
 a switch configured to connect each of the plurality of signal lines to one of the communication unit or ground; and
 a control unit configured to control connection of the switch,
 wherein the control unit is further configured to determine a second signal line of the plurality of signal lines based on capability information of the communication partner,
 wherein the second signal line is independent of the communication between the communication device and the communication partner, and
 wherein the communication unit is further configured to communicate, via the at least first signal line, signal line information associated with the second signal line to the communication partner.

2. The communication device according to claim 1, wherein
 the control unit is further configured to ground the second signal line.

3. The communication device according to claim 1, wherein
 the communication unit is further configured to transmit the signal line information associated with the second signal line to the communication partner.

4. The communication device according to claim 1, wherein
 the control unit is further configured to determine the second signal line based on capability information of the communication device; and
 the control unit is further configured to ground the second signal line.

5. The communication device according to claim 1, wherein
 the communication unit is further configured to receive the signal line information associated with the second signal line.

6. The communication device according to claim 1, wherein
 the control unit is further configured to connect the second signal line to the communication unit based on a lack of a function to ground the second signal line in the communication partner.

7. The communication device according to claim 1, wherein
 the transmission cable complies with a mobile high-definition link (MHL) standard.

8. A communication method, comprising:
 controlling connection of a switch for connecting each of a plurality of signal lines of a transmission cable to one of a communication unit or ground;
 communicating, via at least a first signal line of the plurality of signal lines, at least one of a video signal or an audio signal with a communication partner;
 determining a second signal line of the plurality of signal lines based on capability information of the communication partner,
 wherein the second signal line is independent of the communication between a communication device and the communication partner; and
 communicating, via the at least first signal line, signal line information associated with the second signal line to the communication partner.

9. A communication device, comprising:
 a communication unit configured to communicate, via at least a first signal line of a plurality of signal lines of a transmission cable, at least one of a video signal or an audio signal with a communication partner;
 a switch configured to connect each of the plurality of signal lines to one of the communication unit or ground; and
 a control unit configured to control connection of the switch,
 wherein the control unit is further configured to connect a second signal line of the plurality of signal lines to the communication unit based on a lack of a function to ground the second signal line in the communication partner.

* * * * *